United States Patent [19]

Kaneko et al.

[11] Patent Number: 4,800,448

[45] Date of Patent: Jan. 24, 1989

[54] IMAGE RECORDING/REPRODUCING APPARATUS

[75] Inventors: Kiyotaka Kaneko; Kazuya Oda; Kimihide Takahashi; Izumi Miyake, all of Tokyo, Japan

[73] Assignee: Fuji Photo Film Co. Ltd., Kanagawa, Japan

[21] Appl. No.: 95,166

[22] Filed: Sep. 2, 1987

[30] Foreign Application Priority Data

Sep. 2, 1986 [JP] Japan .................................. 61-206201
Sep. 2, 1986 [JP] Japan .................................. 61-206202
Sep. 2, 1986 [JP] Japan .................................. 61-206203
Sep. 2, 1986 [JP] Japan .................................. 61-206204

[51] Int. Cl.$^4$ .......................... H04N 5/78; G11B 5/02
[52] U.S. Cl. .................................... 360/35.1; 360/27; 358/342; 358/909
[58] Field of Search ..................... 360/33.1, 35.1, 14.1, 360/18, 27, 39, 69, 70, 72.2, 73; 358/906, 909, 335, 342

[56] References Cited

U.S. PATENT DOCUMENTS 4,727,417 2/1988 Kanno et al. .................. 358/909 X Primary Examiner—Eugene R. LaRoche
Assistant Examiner—David Mis
Attorney, Agent, or Firm—Birch, Stewart, Kolasch & Birch

[57] ABSTRACT

An image recording/reproducing apparatus is disclosed which records video signals obtained by photographing an object onto a magnetic recording medium, such as a magnetic disc or the like, or reproduces the video signals recorded on the magnetic recording media. In the image recording/reproducing apparatus, when the object is photographed in a sequential photograph mode, the video signals of the object, as well as, data signals representing the photograph data, including the number of frames to be photographed in one sequential photograph unit and its sequential speed, are recorded onto the magnetic recording medium. During reproduction, the frames recorded in the sequential photograph mode are reproduced at a sequential photograph speed corresponding to the sequential photograph speed of the recording as set forth by the data signals.

8 Claims, 12 Drawing Sheets

IMAGE RECORDING/REPRODUCING APPARATUS

BACKGROUND OF THE INVENTION

1. Field of the Invention

The present invention relates to an image recording-/reproducing apparatus for use in an electronic still camera system or the like which is capable of recording a still image onto a magnetic recording medium or reproducing a still image recorded on the magnetic recording medium.

2. Description of the Prior Art

Recently, there has been developed an electronic still camera which comprises a combination of an image pickup device such as a solid image pickup element, an image pickup tube or the like, and a recording device employing, as the recording medium thereof, a magnetic recording medium such as an inexpensive magnetic disc but having a comparatively large memory capacity, in which an object can be still photographed and the still image can be recorded onto the magnetic recording medium and the reproduction of the recorded image can be carried out by means of a separately arranged reproducing device or the like.

In the above-mentioned electronic still camera, an object in motion, for example, can be photographed by means of a sequential photographing mode in which an object is photographed at a predetermined sequential photographing speed for a given period of time (e.g., 10 frames/sec.) during the depression of a shutter release button, and the still video signals of the photographed object are sequentially recorded onto each of the tracks provided in the magnetic disc.

There is also a desire that the series of video signals of the moving object being recorded at the predetermined sequential photographing speed while in the sequential photographing mode are being to be displayed as a moving image, for example, on the TV screen when the video signals are reproduced.

For this reason, in order that a series of video signals in the single unit recorded in the sequential photographing mode can be reproduced sequentially, it is desired that, when recording, the frame information (photographing data) within the sequential photographing unit be recorded simultaneously. In this case, if the sequential photographing speed of the sequential photographing unit can be recorded simultaneously, it is possible to reproduce the video signals at such a speed as is associated with the sequential photographing speed.

On the other hand, when reproducing an image in accordance with the frame information (photographing data) recorded simultaneously with the video signals of the image, if an operator is able to previously know the contents of the frame information, then the reproduction operation of an image recording/reproducing apparatus can be carried out in a proper and accurate manner.

In addition, in connection with the images recorded in the above-mentioned sequential photographing mode, it would be very convenient if the series of images recorded at a certain photographing speed can be reproduced automatically and repetitively. It is desired that the frame information can be used to perform such repetititive reproduction.

SUMMARY OF THE INVENTION

The present invention aims at eliminating the drawbacks found in the above-mentioned prior art magnetic recording/reproducing systems.

Accordingly, it an objective of the present invention to provide an image recording/reproducing apparatus, which is capable of recording onto a magnetic recording medium, video signals representing still images together with the frame information (that is, photographing information) associated with a sequential photographing mode, or is capable of reproducing a series of still images recorded in the sequential photographing mode at the same sequential photographing speed as recorded.

In order to attain the above objective, according to one embodiment of the present invention, there is provided an image recording/reproducing apparatus in which a magnetic recording medium, such as a magnetic disc or the like, is rotatively driven, and a magnetic head is shifted in the radial direction of the magnetic recording medium to record onto the magnetic recording medium video signals obtained by photographing an object, or to reproduce the video signals recorded onto the magnetic recording medium. The said image recording/reproducing apparatus comprises: photographing mode setting means for setting up a photographing mode including a sequential photographing mode; reproducing mode setting means for setting up one of a plurality of reproducing modes including a sequential-photograph reproducing mode in which reproduction can be performed at the reproduction speed corresponding to a sequential photographing speed; recording means for recording the video signals together with various kinds of data signals onto the magnetic recording medium; signal reproducing means including a magnetic head shift means for shifting a magnetic head in the radial direction of the magnetic recording medium and adapted to reproduce the signals recorded on the magnetic recording medium; memory means for storing photographing data including the data that represents the sequential photographing speed recorded on each of the tracks of the magnetic recording medium; and control means adapted to take in the set output of the photographing mode setting means or reproducing mode setting means. When the photographing mode is set to the sequential photographing mode, the control means control the recording means such that data signals representing the photographing data including the number of frames to be photographed in one sequential photograph unit and its sequential photographing speed can be recorded onto the magnetic recording medium or when the reproducing mode is set to the sequential photographing mode, the control means carry out a track search and store the photographing data recorded on the magnetic recording medium in the memory means as well as read out from the memory means at least the data representing the sequential photographing speed out of the photographing data when reproduction is to be performed. The control means also control the magnetic head shift means, such that it performs its reproducing operation based on the data read out.

It is another objective of the present invention to provide an image recording apparatus which is provided with a function to record the frame information (photographing information) of still images to be recorded onto a magnetic recording medium.

In order to accomplish this objective, according to another embodiment of the present invention, there is provided an image recording apparatus which records video signals obtained by photographing an object onto a magnetic recording medium such as a magnetic disc or the like. The image recording apparatus comprises: photographing mode setting means for setting up a photographing mode including a sequential photographing mode; recording means for recording video signals together with various kinds of data signals onto the magnetic recording medium; and control means adapted to take in the set output of the photographing mode setting means. When at least the sequential photographing mode is set, the control means count the number of frames to be photographed in a single sequential photographing unit. The control means also control the recording medium such that the data signal representing the number of frames counted is recorded onto the magnetic recording medium.

It is still another objective of the present invention to provide an image reproducing apparatus which is capable of reproducing an image properly accordingly to its photographed state regardless of its photographing conditions.

In order to achieve the above objective, according to still another embodiment of the present invention, there is provided an image reproducing apparatus in which a rotary recording medium, such as a magnetic disc or the like, is rotatively driven, and a magnetic head is shifted in the radial direction of the rotary recording medium to reproduce signals, including video signals, representing images recorded on each of the tracks of the rotary recording medium and data signals representing the photographing data of the images, such as a sequential photographing speed and the like. The image reproducing apparatus comprises: signal reproducing means including a magnetic head shift means for shifting a magnetic head in the radial direction of the rotary recording medium and adapted to reproduce the signals recorded on the rotary recording medium; reproducing mode select means for selecting one of a plurality of reproducing modes including a sequential photograph reproducing mode in which reproduction is performed at a reproduction speed corresponding to a sequential photograph speed; memory means for storing photographing data including data representing the sequential photograph speed recorded on each of the tracks of the rotary recording medium; and control means adapted to take in the output of the reproducing mode select means. When the selected reproducing mode is in the sequential photograph reproducing mode, the control means drive the magnetic head shift means to perform a track search based on the output of the signal reproducing means so as to store the photograph data recorded on the rotary recording medium into the memory means, as well as, when reproducing, read out at least the data representing the sequential photograph speed among the photograph data, the control means drive and control the magnetic head shift means such that reproduction is performed based on the sequential photograph speed represented by the data read out.

It is a further objective of the present invention to provide an image reproducing apparatus which is capable of displaying on a display device the photograph data of images recorded on each of the tracks provided on a magnetic recording medium before the images are reproduced.

In order to achieve the above objective, according to a further embodiment of the present invention, there is provided an image reproducing apparatus which comprises: signal reproducing means for reproducing video signals representing images recorded on a magnetic recording medium and data signals representing the photograph data of the images, such as a sequential photograph speed and the like; data signal extract means for extracting the data signals reproduced from each track by the signal reproducing means; display means for displaying the images or the photograph data; and control means responsive to the data signals extracted by the data signal extract means to allow the display means to display the photograph data such that the photograph data correspond to the images recorded on each of the tracks.

It is a still further objective of the present invention to provide an image reproducing apparatus having a function to be able to automatically and repetitively reproduce a series of images photographed in a sequential photograph mode among images recorded on a magnetic recording medium from the data signal representing the photograph mode of the images.

In accomplishing the above objective, according to a still further embodiment of the present invention, there is provided an image reproducing apparatus which comprises: signal reproducing means for reproducing video signals representing still images recorded on each of the tracks in a magnetic recording medium and photographed in photograph modes including at least a sequential photograph mode, as well as, data signals representing the photograph data of the still images, such as the photograph modes and the like; video signal process means for processing the video signals reproduced from each track by the signal reproducing means into TV signals; data signal extract means for extracting the data signals from of the signals reproduced from each track by the signal reproducing means; display means for displaying the still images or the phoograph data; repetitive reproduction setting means for directing that only a series of sequential photographed frames photographed in the sequential photograph mode are to be reproduced repetitively; and control means adapted to take in the outputs of the data signal extract means and repetitive reproduction setting means. When the video signal output from the signal reproducing means is determined to be the video signal representing one frame of still image photographed in the sequential photograph mode from the data signal extracted by the data signal extract means, the control means the signal reproducing means and video signal process means, such that the video signals corresponding to a series of sequential photograph frames of still images photographed in the sequential photograph mode are output sequentially and repetitively to the display means during a period set by the repetitive reproduction setting means.

BRIEF DESCRIPTION OF THE DRAWINGS

The exact nature of this invention, as well as other objective and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

A detailed description of the preferred embodiments of an apparatus for recording or reproducing still image information according to the present invention with reference to the accompanying drawings will be given below.

Figure 1:
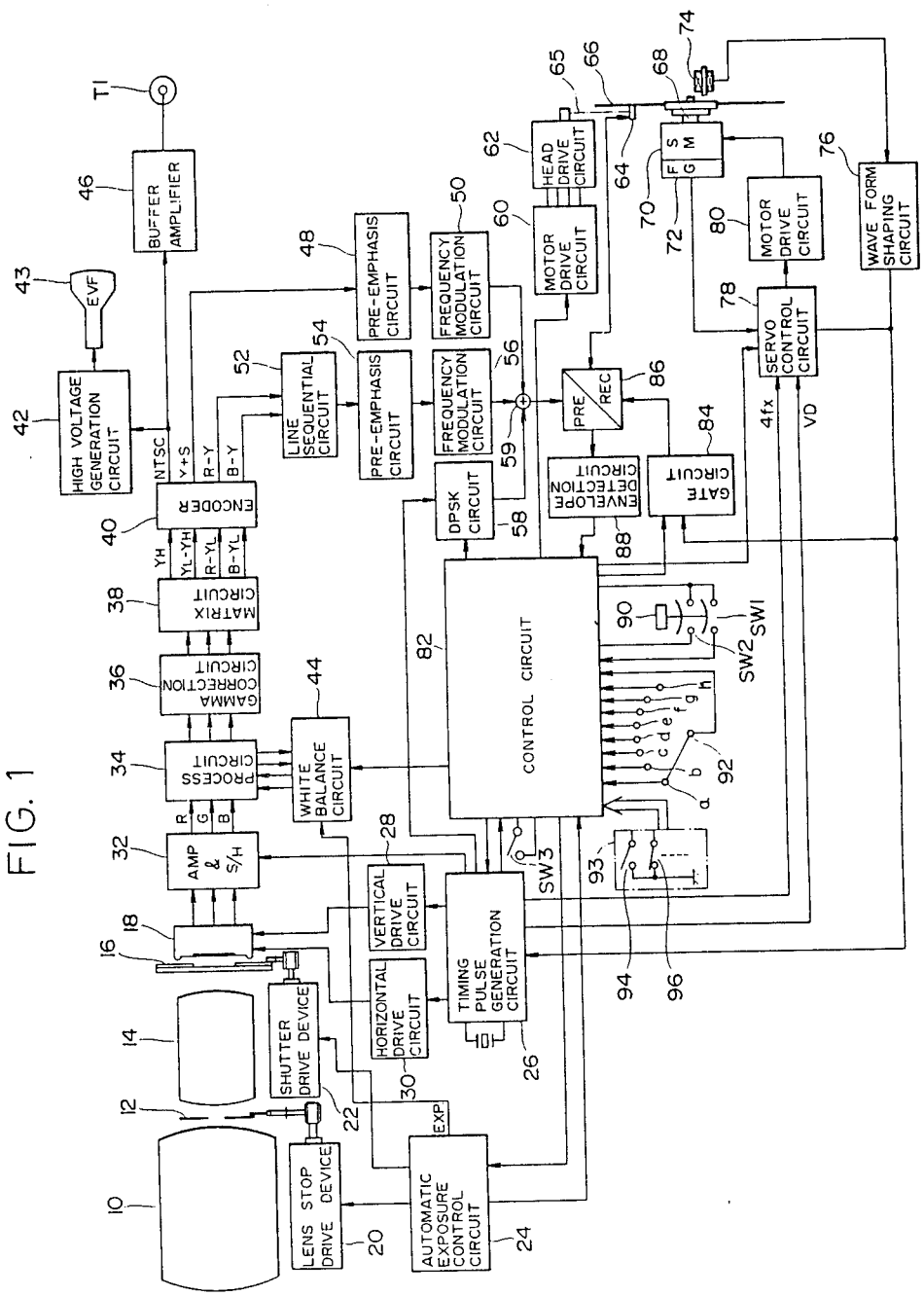
FIG. 1 is a block diagram of an embodiment of an image recording apparatus according to the present invention, illustrating its structure.

Referring first to FIG. 1, there is shown a structure of an electronic still camera as an embodiment of an image recording apparatus according to the present invention.

In FIG. 1, the image pickup part of the electronic still camera is primarily composed of a photographing optical system which includes a focal lens 10, a lens stop 12, a master lens 14, a shutter 16, a solid state image pickup element (in this embodiment, a CCD is used) 18, a lens stop drive device 20 for driving the lens stop 12, a shutter drive device 22 for driving the shutter 16, and an automatic exposure control circuit 24 for controlling the lens stop drive device 20 and the shutter drive device 22.

The solid state image pickup element 18 is driven by drive signals from a vertical drive circuit 28 and a horizontal drive circuit 30 both of which can be operated upon receiving pulse signals output from a timing pulse generation circuit 26. The timing pulse generation circuit 26 is used to generate various kinds of pulse signals for controlling the respective circuit parts of the electronic still camera.

On the other hand, the recording system circuitry of the electronic still camera comprises a preamplifier 32 for sampling primary color signals, R, G, and B, obtained from the solid state image pickup element 18 and amplifying them to a predetermined level; a process circuit 34 for adjusting the color temperature of the primary color signals R, G, B output from the preamplifier 32 of a predetermined value according to signals outputted from a white balance circuit 44; a gamma correction circuit 36 for performing a color signal process for gamma correction on the primary color signals outputted from the process circuit 34; a matrix circuit 38 for creating brightness signals, $Y_H$ and $Y_L-Y_H$, and color difference signals, $R-Y_L$ and $B-Y_L$, respectively, having a predetermined signal bandwidth according to the primary color signals, R, G, and B output from the gamma correction circuit 36; and an encoder 40 for composing a video signal NTSC, a brightness signal, Y+S, including including a composite synchronization signal S, and color difference signals, R−Y and B−Y, according to the above-mentioned signals outputted from the matrix circuit 38. The recording system circuitry further includes a pre-emphasis circuit 48 for performing a given frequency correction on a brightness signal, Y+S, among the signals composed by the encoder 40; an FM circuit 50 for frequency modulating the brightness signal, Y+S outputted from the pre-emphasis circuit 48; a line sequence circuit 54 for converting the color difference signals, R−Y and B−Y, among the signals composed by the encoder 40 into line sequence color difference signals; a pre-emphasis circuit 54 for performing a given frequency correction on the line sequential color difference signals outputted from the line sequential circuit 54; an FM circuit 56 for frequency modulating the line sequential color difference signals output from the pre-emphasis circuit 54, a differential phase shift keying (DPSK) circuit 58 for recording the photograph data according to a predetermined format (for example, a format to convert the photograph data into data signals having a frequency of about 200 KHz); a mixer 59 for mixing together the frequency modulated (FM) brightness signal outputted from the FM circuit 50, the FM line sequential color difference signal outputted from the FM circuit 56, and various kinds of data signals outputted from the DPSK circuit 58 to create an FM video signal for recording; a pre-amplifier 86 for setting the recording FM video signal outputted from the mixer 59 to a given level; and a magnetic head 64 for recording the FM video signal outputted from the pre-amplifier 86.

The illustrated pre-amplifier 86 is composed of a recording amplifier and a reproducing amplifier to be described later and the operation of the pre-amplifier 86 can be switched according to gate signals outputted from a gate circuit 84 only during a predetermined period.

The magnetic head 64 can be moved by a head drive motor 62 along the record surface of a magnetic disc 66 in a radial direction, as shown concepceptually by a dashed line 65. The head drive motor 62 receives a drive pulse having 4 phases, A, $\overline{A}$, B, and $\overline{B}$, to perform 1-2 excitation by the motor drive circuit 60 which is operable when it receives an 8-bit motor drive signal outputted from a control circuit 82. The shift direction of the magnetic head 64 depends upon the direction of rotation of the head drive motor 62, and the shift distance of the magnetic head 64 is proportional to the angle of rotation of the head drive motor 62. For example, each of the shift pulses applied to the head drive motor 62 can rotate the head drive motor 62 about 18°, and as a result of this, the magnetic head 64 can be shifted about 5 μm. Therefore, 20 shift pulses can move the magnetic head 64 about 100 μm or 1 track.

Figure 2:
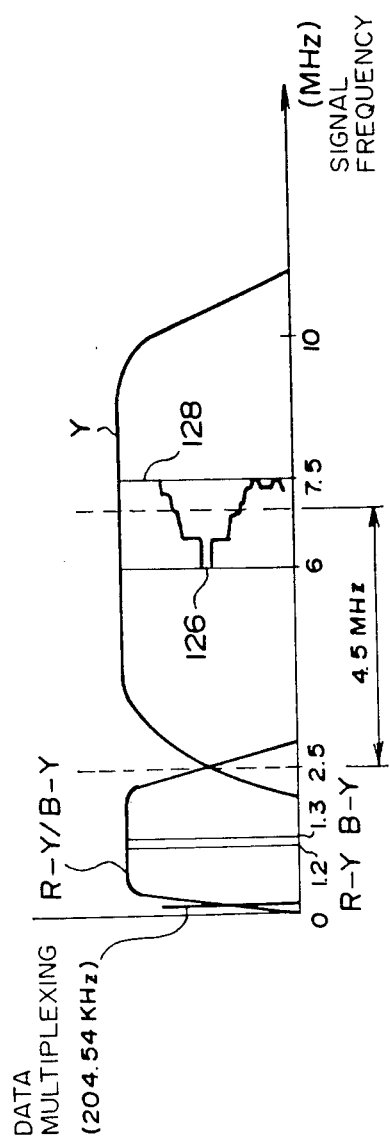
FIG. 2 is a view showing the frequency spectrums of data signals and video signals to be recorded in the magnetic disc.

There is provided a home position HP in the outermost peripheral side of the magnetic disc 66. The home position HP is not on the magnetic disc 66, but it is a limit position which is allocated to the moving path of the magnetic head 64. The home position HP can be sensed by a home position switch. To move the magnetic head 64 from its outer peripheral side of the magnetic disc 66 to the inner peripheral side is referred to herein as forward feeding and to move the magnetic head 64 in the reverse direction is referred to as reverse feeding. Also, as shown in FIG. 2, there are recorded on the magnetic disc 66 in the frequency multiplexed manner: a data signal having a frequency of about 204.54 KHz; a color difference signal, R−Y, of 1.2 MHz; a color difference signal, B−Y, of 1.3 MHz; and a brightness signal, Y, having a frequency centering around 7 MHz with its sync tip level 126 being set to 6 MHz and its white peak level 128 being set to 7.5 MHz.

On the other hand, the magnetic disc 66 is detachably mounted to the rotary shaft 68 of a spindle motor 70, and it can be steadily rotated in a predetermined direction by means of the spindle motor 70, a frequency generator (FG) 72, a PG detection coil 74, a waveform forming circuit 76, a servo control circuit 78, and a motor drive circuit 80.

The PG detection coil 74 detects a PG yoke (not shown) of a magnetic material embedded in the rotary shaft of the magnetic disc 66, and the resultant PG signals are input through the waveform forming circuit 76 to the servo control circuit 78, a gate circuit 84, and the timing pulse generation circuit 26, respectively.

The gate circuit 84 is adapted to output a gate signal to the above-mentioned pre-amplifier 86. The gate signal is formed based on the PG signal detected by the PG detection coil 74 and a record/reproduction command signal outputted from the control circuit 82.

The spindle motor 70 can be initiated by operating a shutter release button 90 after a power switch SW 3 is closed. In other words, the shutter release button 90, in this embodiment, is adapted such that it can be operated in a 2-stage stroke manner. In its first stroke, a switch SW1 is closed so that power is supplied to the respective drive circuits of the present apparatus. As a result of this, the servo control circuit 78 outputs to the spindle motor 70 through the motor drive circuit 80 a drive signal to drive the spindle motor 70. Further, in the second stroke of the operation of the shutter release button 90, a switch SW2 is closed so that the control circuit 82 controls the operations of the respective circuits to execute the shutter release, photographing and recording. The above-mentioned structure of the present apparatus can eliminate the waste of the power coming from a power source, such as a battery or the like.

Also, reference numeral 88 designates an envelope detection circuit which is used to detect an envelope of a FM video signal outputted through the above-mentioned pre-amplifier 86 and output its detection output thereof to the control circuit 82. The control circuit 82 is used to perform the track search of the magnetic disc 66, decide whether drop-out produced in the magnetic disc 66 is present or not and to perform other operations.

The video signal in the NTSC system that is outputted from the encoder 40 is passed through a high voltage generation circuit 42 and is then visualized in an electronic view finder 43. At and, at the same time, it is passed through a buffer amplifier 46 and is then outputted externally via a video signal output terminal T1.

The control circuit 82 manages and controls the operations of the entire image recording apparatus which is provided with various kinds of interfaces and memory devices, such as a ROM, storing in it a control program and the like. For example, various kinds of controls can be performed by the control circuit 82 by means of a sequential photograph speed setting switch 92 for setting the number of frames to be photographed at a given time (a sequential photograph speed), or a group of switches 93 for specifying the states of photographing and recording or the like. The control circuit 82 is equipped with a frame counter for counting the photograph frames in a sequence in each of photographing modes to be discussed later.

The sequential photograph speed setting switch 92 is provided with 8 contacts (contacts a, b, c, d, e, f, g, and h) which can be selected manually, so that the number of frames to photographed at a given time can be decided according to the selection of the contacts. In the present embodiment, for example, the selection of the contact, a, allows 15 frames/sec. to be photographed. Similarly, by selecting the contacts b through h, sequentially, 10 frames/sec. (contact b), 5 frames/sec. (contact c), 2 frames/sec. (contact d), 1 frame/sec (contact e), 1 frame/2 sec. (contact f), 1 frame/5 sec. (contact g), and 1 frame/10 sec. (contact h) can be photographed respectively.

The key group 93 is composed of a photograph mode selection switch 94 adapted to select a single photograph mode for terminating, for example, the photographing operation for each frame or a sequential photograph mode in which only a given number of frames are photographed sequentially, and a record mode switch 96 for specifying that a still image photographed based on these photograph modes is field recorded or frame recorded frame by frame. In the present embodiment, when the photograph mode select switch 94 is open, a single photograph mode is selected, while when it is closed, the sequential photograph mode is selected. Also, when the record mode switch 96 is open, the field record is carried out, and when it is closed, the frame record is performed.

Figure 3:
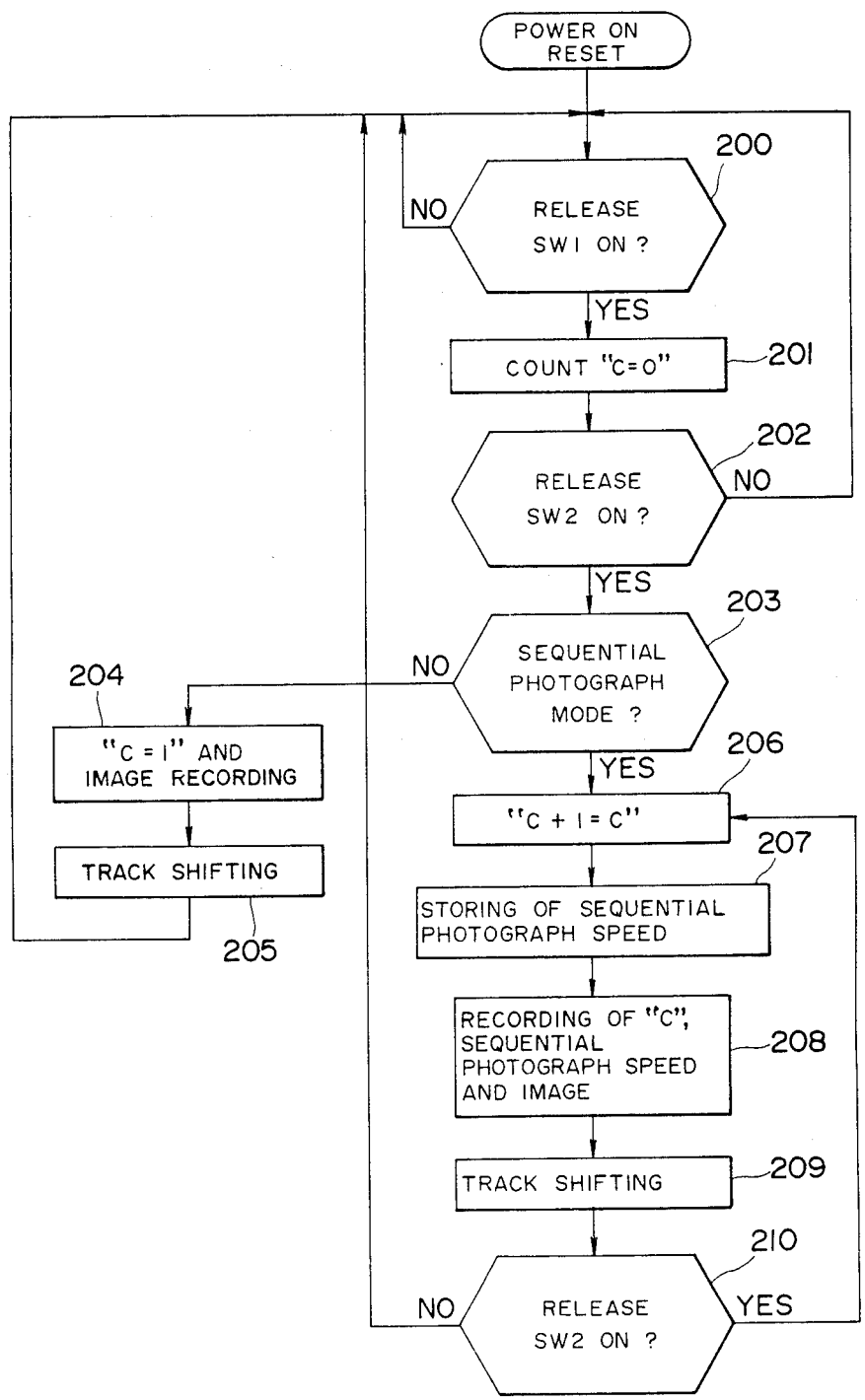
FIG. 3 is a flowchart to show the contents of a photograph sequence to be executed by a control circuit shown in FIG. 1.

Referring next to FIG. 3, there are shown the contents of a process routine in the photograph sequence executed by the control circuit 82. In FIG. 3, if the power switch SW3 is closed, then the power supply will initiate a program. As a result of this, in Step 200, it is decided whether the switch SW1 is closed or not, which is the first stroke of the shutter release button 90. If the switch is found still open, the same process is carried out repeatedly until it is closed. On the other hand, if the switch SW1 is found closed in Step 200, the process advances to Step 201. After the count value C of a frame counter of the control circuit 82 is reset to C=0 in Step 201, the process goes to Step 202 to determine whether the switch SW2, the second stroke of the shutter release button 90, is closed or not. If the switch is found still open, the process goes back to Step 200 and the same process is repeated. On the other hand, if the switch SW2 is found closed in Step 202, then the process goes forward to Step 203. In Step 203, it is checked whether the sequential photograph mode is selected or not. That is, it is checked whether the sequential photograph mode switch 94 is closed or not. If the sequential photograph mode switch 94 is found not closed in Step 203, then it is decided that the single photograph mode is selected and thus the process advances to Step 204. In Step 204, the count value C of the frame counter of the control circuit 82 is set to C=1 and the data signal representing the count value C (the number of frames) is multiplexed with the video signal and then recorded on the track of the magnetic disc 66. After the process is completed in Step 204, the process goes forward to Step 205. In Step 205 a control operation to shift the magnetic head 64 to an unrecorded track is performed. After the control operation in Step 205 is completed, the process goes back to Step 200 and the same process is repeated.

On the other hand, if the sequential photograph mode switch 96 is found closed in Step 203, it is decided that the sequential photograph mode is selected and thus the process goes forward to Step 206. In Step 206, the count value C of the frame counter of the control circuit 82 is increased by 1. That is, the count value C is set to C=1. After completion of the count incrementation in Step 206, the process advances to Step 207. In Step 207, a contact, by which the sequential photograph speed setting switch 92 is selected, is detected and then the sequential photograph speed (for example, 5 frames/sec.) corresponding to the detected contact is stored. After the detection and storing process of Step 207 is completed, the process goes on to Step 208, in which the count value C of the frame counter and the sequential photograph speed are read out and a data signal representing the count value C, that is the number of frames; a data signal representing the sequential photograph speed; and a video signal, corresponding to 1 frame, are multiplexed and recorded. After the processings in Step 208 are completed, the process proceeds to Step 209. In Step 209, the magnetic head 64 is shifted to the next unrecorded track. After completion of the shifting operation in Step 209, the process goes on to Step 210, where it is checked whether the switch SW2 is closed or not. If the switch SW2 is found closed in Step 210, the process goes back to Step 206, where the count value C of the frame counter of the control circuit 82 is further increased by 1 and thus it is set to C=2. After completion of the incrementation in Step 206, the process goes through Steps 207 to 210, in which it is again checked whether the switch is still closed or not. If the switch SW2 is found still closed in Step 210, the process returns back again to Step 206, in which the count value C of the frame counter of the control circuit 82 is increased by 1 each time. That is, each time 1 frame of a still image is recorded on 1 track in the processings of Step 208, the frame number that is increased by 1 and the sequential photograph speed is always recorded on the same track as similarly mentioned above.

On the other hand, when it is found in Step 210 that the switch SW2 has returned back to its open state, it is decided that the photographing and recording of a predetermined number of frames have terminated and thus the process goes back to Step 200, in which the same processing is repeated.

As can be seen from the foregoing description, in the electronic still camera according to the illustrated embodiment of the invention, a frame of the still image is recorded on one of the tracks of the magnetic disc, and during such recording, the frame information, the number of the frame representing the sequential relationship of the frame, is recorded, and at the same time, a sequential photograph speed, photograph information of the frame, is recorded on the same track, so that a reproducing apparatus is able to use the frame information so as to reproduce the still image.

Although in the above-mentioned embodiment two kinds of data, that is the frame number and the sequential photograph speed of the frame are recorded as the frame information, the present invention is not limited to these two kinds of data, but other data such as exposure, white balance, photographed date and the like may also be recorded.

Also, recording of these various kinds of data is not limited to the frequency multiplexed recording disclosed in the illustrated embodiment, but, for example, signals representing various kinds of data may be inserted into a video signal for recording.

In addition, although in the illustrated embodiment the number of photographed frames is counted by a frame counter provided in a control circuit, the number of photographed frames may be counted by a software program, or a device for counting the number of photographed frames may be provided external of the control circuit.

As has been described above, the illustrated image recording apparatus according to the present invention, is structured such that it is capable of controlling the recording means in such a manner that, when a video signal obtained by photographing an object is recorded onto a magnetic recording medium such as a magnetic disc or the like, the set output of photograph mode setting means is also recorded. When least a sequential photograph mode is set, the number of frames to be photographed in a sequential photograph unit is counted and at the same time, a data signal representing the counted number of frames is recorded onto the magnetic recording medium, whereby a moving object recorded in the sequential photograph mode can be reproduced in the same moving manner.

Figure 4:
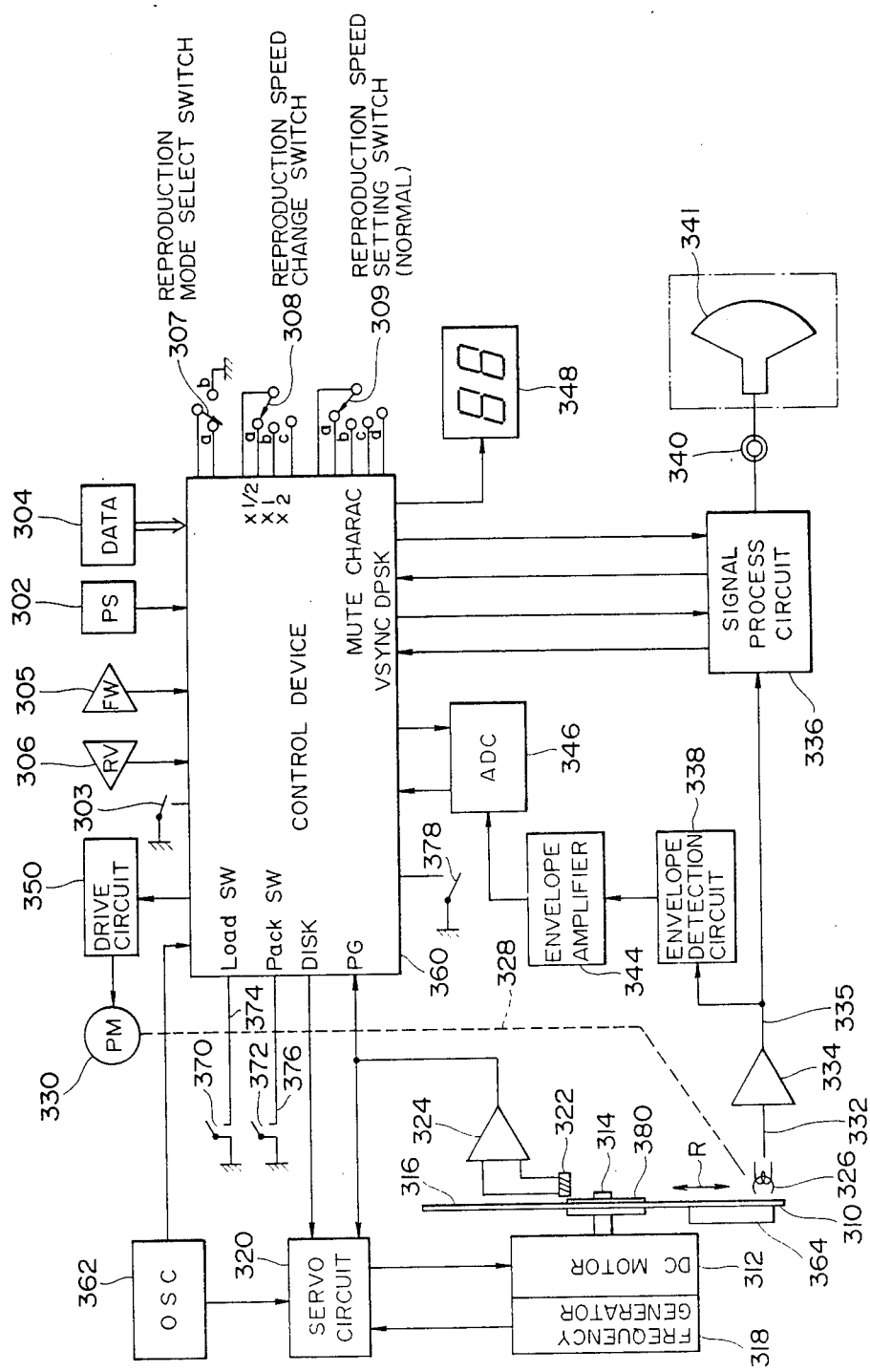
FIG. 4 is a block diagram of an embodiment of another image reproducing apparatus according to its invention, illustrating the structure.

Referring next to FIG. 4, there is shown a structure of another embodiment of an image reproducing apparatus, according to the present invention. In FIG. 4, a magnetic recording medium 310, such as a magnetic disc or the like, is removably mounted to a spindle 314 which is driven by a DC motor 312. In this embodiment, the magnetic disc 310 includes a sheet of magnetic material having a diameter of about 50 mm having a recording surface 316 on which a plurality of, tracks are formed for example, 50 recording tracks are formed concentrically with a pitch of about 100 $\mu$m. Signals which are recorded on the recording tracks, in this embodiment, are video signals and data signals. Among them, the video signals are FM video signals which are the frequency modulated versions of, for example, brightness signals and chroma signals. In the case of the FM video signals, for example, field video signals forming a field of an image by means of raster scanning are recorded on one track. On the other hand, the data signals are frequency multiplexed and recorded together with the FM video signals. The data signals are also DPSK signals (that is, Differential Phase Shift Keyed signals) which represent the photographed conditions of the still image to be reproduced based on the FM video signals. The conditions, for example, include the discrimination of a single photograph mode in which a photograph operation is terminated for each of the frames or a sequential photograph mode in which photograph operations are carried out sequentially at a set sequential photograph speed, a sequential photograph speed, white balance, and so on.

The DC motor 312 is provided with a frequency generator 318 which generates AC frequency signals. The motor 312 is with supplied power by a servo circuit 320 to be servo controlled such that the magnetic disc 310 is rotated at a predetermined constant rotational speed, for example, at 3600 revolutions/min. The servo circuit 320 is connected to a control device 360 which controls the whole image reproducing apparatus. Also, the circuit 320 is responsive to the signal DISK to control the driving or stopping of the rotation of the magnetic disc 310.

At a predetermined position or the recording surface 316 of the magnetic disc 310, there is provided a phase generator 322 which is connected through an amplifier 324 to the servo circuit 320 and the control device 360. By means of such a connection, a timing mark, which is formed so as to correspond to the predetermined position on the recording surface 316, is detected, and a timing pulse PG is created.

Above the recording surface 316 there is arranged a magnetic transducer, that is a magnetic head 326 which is supported by a support mechanism 328. The support mechanism 328, as shown conceptually by a dotted line 328, is driven by a stepping motor (PM) 330 and is adapted to be able to move the magnetic head 326 along the recording surface 316 in a radial directions, as shown by an arrow R, so as to select an arbitrary track on the recording surface 316.

The magnetic head 326 may be provided with a magnetic recording function. However, in this embodiment, there is illustrated a magnetic head which is provided with a reproducing function to detect the video signals previously recorded on the recording surface 316 and convert the detected video signals into their corresponding electric signals. As mentioned above, in this embodiment, since the magnetic disc 310 is constantly rotated at 3600 revolutions/min., 1 track of video signals, that is 1 field of FM video signals are reproduced each revolution (1/60 sec.) by the magnetic head 326. When they are demodulated, these signals are compatible with standard color television systems, such as an NTSC system and the like.

The reproduction output 332 of the magnetic head 326 is connected through a pre-amplifier 334 to a signal process circuit 336 and an envelope detection circuit 338.

Figure 5:
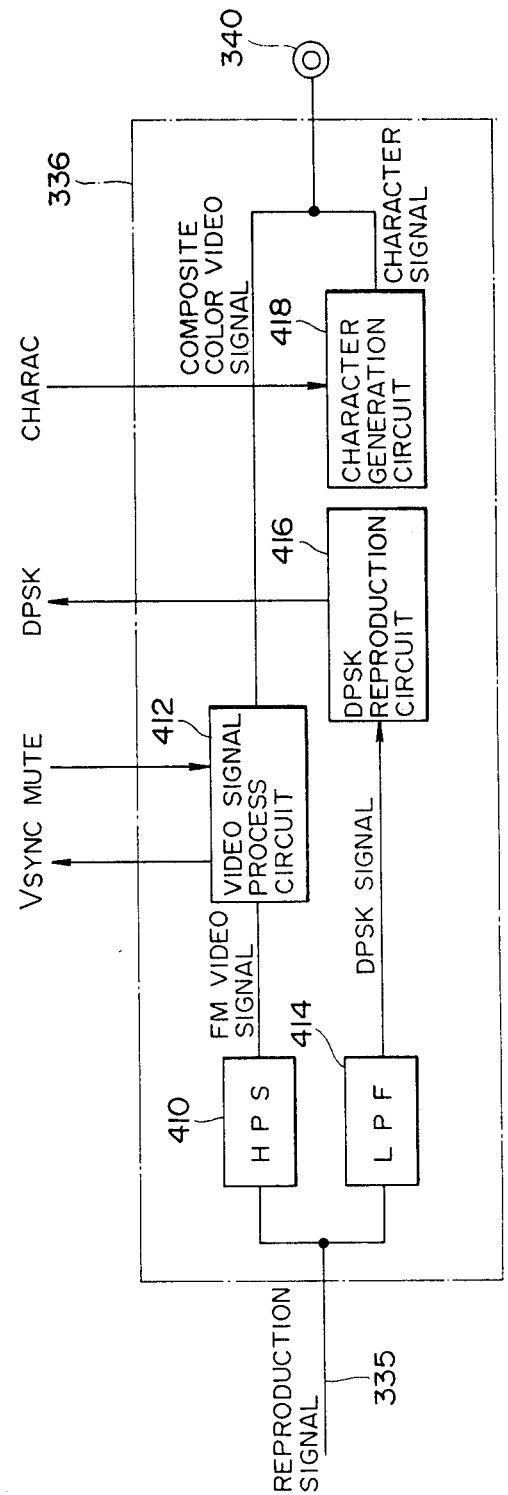
FIG. 5 is a block diagram showing the concrete structure of a signal process circuit of the image reproducing apparatus shown in FIG. 4.

The signal process circuit 336, for example, as shown in FIG. 5, comprises a video signal process circuit 412 which is used to process the FM video signals that have passed through a high pass filter (HPF) 410 capable of extracting the FM video signals having a frequency of about 300 KHz or more out of the FM video signals. DPSK signals that have been reproduced by the magnetic head to provide composite color video signals (television signals) in the NTSC system are passed through a low pass filter (LPS) 414 adapted to extract the DPSK signals having a frequency of about 300 KHz or less. A DPSK reproducing circuit 416 is adapted to reproduce the DPSK signals that have been passed through the low pass filter 414, and a character generation circuit 418 is adapted to generate signals representing predetermined characters such as numerals, letters, figures and the like, based on the DPSK signals reproduced by the DPSK reproducing circuit 416.

The video signal process circuit 412 extracts a vertical synchronization signal VSYNC from the composite color video signal to supply the signal to the control device 360 when the video signal process circuit receives a control signal, MUTE, outputted from the control device 360, it performs a muting operation, that is it makes the composite color video signal, a blank signal, during the effective horizontal scanning period of the composite color video signal. For example, only while signals are being outputted from the character generation circuit 418, the composite color video signals from the signal process circuit 412 can be prevented from being outputted from a signal output terminal 340.

The DPSK reproducing circuit 416 outputs the reproduced signal of the DPSK signal to the control device 360 and the control device 360 in turn outputs a control signal CHARAC to the character generation circuit 418 in accordance with the reproduced signal. When receiving the control signal CHARAC, the character generation circuit 418 outputs through the signal output terminal 340 to a display device 341, such as a TV monitor or the like, a character signal equivalent to a video signal for displaying a predetermined character on a display screen.

The envelope circuit 338 is a detection which detects the envelope of the FM video signal recorded on the tracks on the recording surface 316 and then outputs a voltage corresponding to the detected envelope. The envelope detection circuit 338 is connected through an envelope amplifier 344 to an analog/digital converter (ADC) 346. In this embodiment, the ADC 346 has a quantization levels of 256 and it outputs to the control device 360 in the form of 8-bit data, responsive to a demand from the control device 360.

The control device 360 is adapted to read the states of the various kinds of switches including, a forward feed key FW5, a reverse feed key RV6, a repeat switch 303, a data key group DATA 304, a reproduction mode select switch 307, a reproduction speed change switch 308, a reproduction speed setting switch 309, and other switches, to control the reproduction of the FM video signals and the DPSK signals and to perform a tracking control to be described later. The control device 360 comprises a microprocessor, memories (for example, ROM, RAM and the like) for storing the program of the microprocessor and required data signals, and interfaces provided between its peripheral elements, circuits, devices and the like and the control device.

In this embodiment, as mentioned above, there are provided as input means a forward feed key FW5 for shifting the magnetic head 326 in the forward direction of the track numbers (for example, in the direction running from the outside tracks toward the inside tracks), a reverse feed key RV6 for shifting the magnetic head 326 in the reverse direction, a data key group DATA 304 for displaying on the TV monitor 341, in various manners, the information contained in the DPSK signal to indicate that the magnetic head 326 is being repetitively shifted to the respective tracks where a series of still images photographed in the sequential photograph mode modes are recorded corresponding to to the above-mentioned track shifting by means of operation of the forward feed key FW5 or the reverse feed key RV6; a reproduction mode select switch 307 for selecting either a normal reproducing mode in which reproduction is carried out at a reproduction speed set by a reproduction speed setting switch 309 irrespective of the mode used to photograph the still image recorded in the tracks of the magnetic disc 310 or a sequential photograph reproducing mode in which the still image recorded in the sequential photograph mode is reproduced at a reproduction speed corresponding to the sequential photograph speed; a reproduction speed change switch 308 for changing the sequential photograph speed used in recording when the still image is reproduced in the sequential photograph reproducing mode; and a reproduction speed setting switch 309 for selecting the reproduction speed when the normal reproduction mode is used. These input means are connected to the control device 360. Also, to the control device 360 there is connected a power switch PS2. The number of the track on which the magnetic head 326 is located after it is shifted there by the forward feed key FW5 or reverse feed key RV6 is displayed on a display 348 which is composed of a 7-segment LED(Light-Emitting Diode).

The data key group DATA 304 includes, as a main component, a photograph mode key which is used to discriminate a track recording a still image photographed 1 frame in the single photograph mode from a track recording a still image sequentially photographed in the sequential photograph mode according to the DPSK signals recorded on the respective tracks, with respect to the tracks of the magnetic disc 310, for example, all of the tracks, and then specify the results to be displayed on the TV monitor 341.

The reproduction mode select switch 307 is adapted to perform reproduction in the normal reproduction mode when it is switched to the contact, a, and carries out reproduction in the sequential reproduction mode when it is changed over to the contact, b. The reproduction speed change switch 308 is a switch which is used to correct the sequential photograph speed in recording when the sequential photograph reproduction mode is set. For example, when it is changed over to the contact, a, the reproduction is performed at a speed which is one half of the sequential photograph speed in recording. When it is changed over to the contact, b, the reproduction is carried out at the same speed with the sequential photograph speed in recording. And, when it is switched over to the contact, c, the reproduction is achieved at the speed twice the sequential photograph speed in recording.

Also, the reproduction speed setting switch 309 is a switch to select the reproduction speed when the normal reproduction mode is set, and, in this embodiment, it is adapted so that it can be changed in 4 stages. The control device 360 receives the respective outputs of the reproduction mode select switch 307, reproduction speed changes switch 308 and reproduction speed setting switch 309 and then performs processings to be described later.

The stepping motor 330, in this embodiment, is a 4-phase-drive pulse operated motor which can be rotated approximately 15° response to 1 drive pulse. Therefore, the stepping motor 330 is rotated one full cycle for 24 drive pulses. The head support mechanism 328 is adapted to shift the magnetic head 326 about 4.2 μm in the direction of the arrow R for 1 pulse supplied to the stepping motor 330. An excitation time corresponding to 1 pulse is, for example, on the order of 2-3 millisecond. Therefore, 24 pulses can move the magnetic head 326 about 100 μm.

Thi drive pulse is supplied from the drive circuit 350 comprising a current amplifier which is adapted to generate an excitation coil drive pulse for the stepping motor 330 in accordance with an excitation pattern indicated by the control device 360.

The control device 360 and servo circuit 320 are both responsive to a reference clock signal generated by a reference generator (OSC) 362. In this embodiment, the servo circuit 320 is supplied with a reference signal having a frequency of 60 Hz equal to the field frequency of a raster scan video signal to be recorded in the magnetic disc 310, while the control device 360 is supplied with a clock signal having a high frequency, for example, a frequency of 3.58 MHz.

Figure 6:
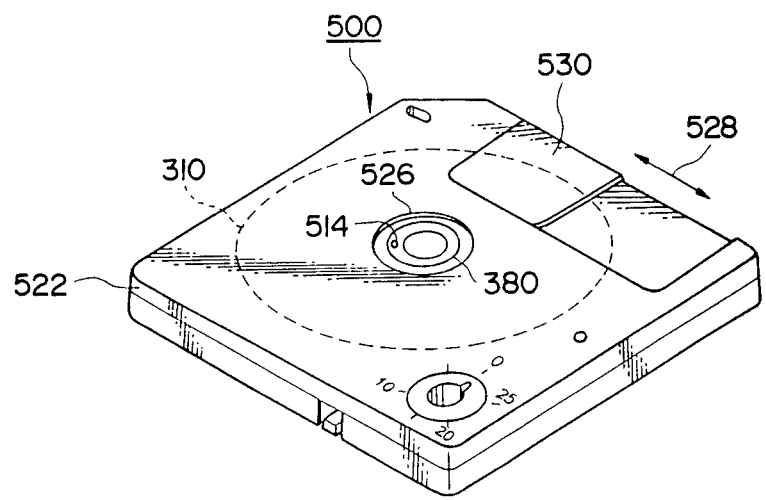
FIG. 6 is a perspective view of an example of a magnetic disc pack which can be used in the image reproducing apparatus shown in FIG. 4.

Referring now to FIG. 6, there is shown a magnetic disc pack 500 which is used with this embodiment. The magnetic disc pack 500 includes a box structure 522 in which the magnetic disc 310 being thin, small in diameter, and used for recording image signals can be stored in a rotatabl manner. Substantially in the central portion of the box structure 522, there is formed a circular opening 526, so that a hub or core located centrally of the magnetic disc 310 can be exposed through the opening 526. A core 380 is provided with a magnetic material 514 to excite the coil 322 of the phase generator.

When the magnetic disc pack 500 is mounted to a still image reproducing apparatus 600, the tip end portion of the spindle 14 is chucked to the core 380 so as to enable rotation of the magnetic disc 310 within the magnetic disc pack 500.

In the magnetic disc pack 500, there is provided a shutter 530 which can be moved in a direction parallel to one of the sides of the magnetic disc pack 500, as shown by an arrow 528. If this shutter 530 is moved to a position opposite to the illustrated position the opening of the box structure 522 located below the shutter 530 is exposed so that a regulation plate 364 and the magnetic head 326 can be approached to or can be abutted against the magnetic disc 310.

Figure 7A:
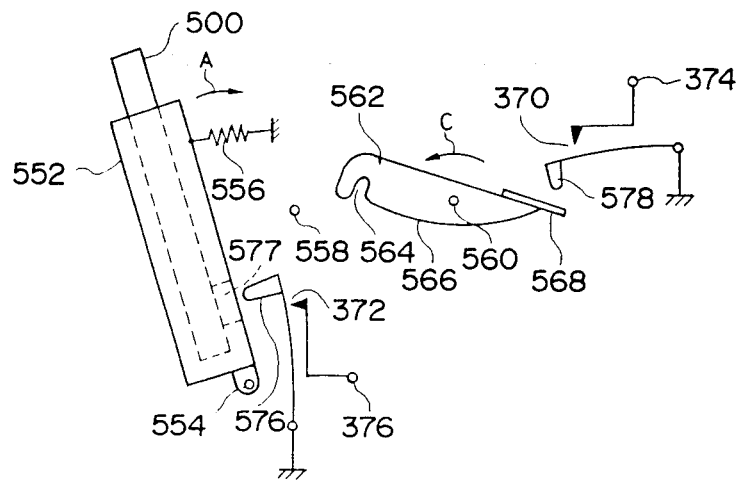
FIGS. 7A and 7B, respectively, are explanatory views to illustrating how to mount the magnetic disc pack.

As shown in FIG. 7A, the magnetic disc pack 500 with the magnetic disc 310 stored in it is inserted into its holder 552 so that the disc pack 500 can be mounted to the present still image reproducing apparatus. The holder 552 holds the magnetic disc pack 500 in a removable manner holds and is also supported by the box structure of the image reproducing apparatus such that it is rotatable about a point of intersection 554. The holder 552 is normally energized in a direction opposite to an arrow A by an erengizing means 556. When the holder 542 is situated at the position shown in FIG. 7A, the magnetic disc pack 500 can be taken out from the holder 552.

Figure 7B:
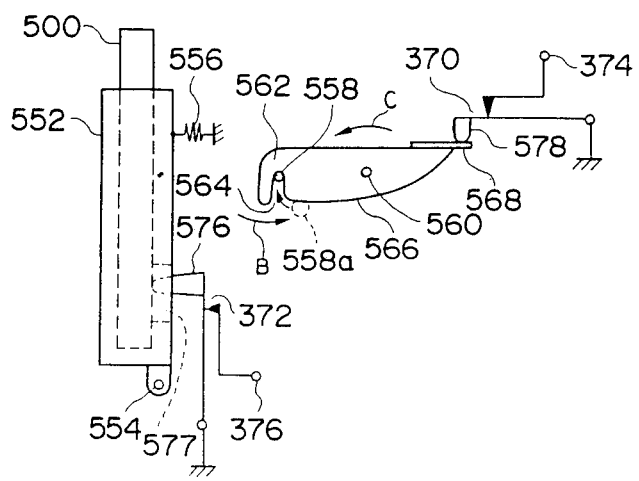

When the magnetic disc pack 500 is inserted into the box structure of the reproducing apparatus and the holder 552 is pushed in the direction of the arrow A, an engagement member 558 can be operated cooperatively with the movement of the holder 552. That is, as shown in FIG. 7B, the engagement member 558 in the direction of an arrow B along one side 566 of an arm 562, which can be energized and rotated about a fulcrum 560 in the direction of an arrow C, up to a position shown by a dotted line 558a. At this position, if the operator's hand is released from the holder 552, the holder 552 can be positioned at its normal mounting position by means of the energizing force of the energizing means 556 and the engagement member 558 can be placed into an engagement groove 564 formed at the top end portion of the arm 562 for engagement therewith. At this time, the spindle 314 is chucked correctly to the core 380 of the magnetic disc 310.

In this state, a pressure portion 568 provided at the other end of the arm 562 is pressed against a projection 578 provided in a contact 370, which is normally open, to close the contact 370. That is, the contact 370 is arranged such that it can be closed only when the holder 552 is located in its normal mounted position. The contact 370 includes an output terminal 374 which, as shown in FIG. 4, is connected to the control device 360, whereby the control device 360 is able to detect whether the magnetic disc pack 500 is normally mounted or not. In this manner, the contact 370 constitutes a load switch shown in FIG. 4.

Also, the holder 552 is formed in the lower portion with an opening, as shown by a dotted line. Thus, when the holder 552 arrives at its normal mounting position, the projection 576 of the normally open contact 372 is moved into the opening 577 and abutted against the magnetic disc pack 500, so that the projection 576 is pushed back by the magnetic disc pack 500 to close the contact 372. When the magnetic disc pack 500 is not stored in the holder 552 at its normal state, then the contact 372 cannot be closed. The contact 372 includes an output terminal 376 which, as shown in FIG. 4, is connected to the control device 360, so that the control device 360 is able to detect the presence or absence of the magnetic disc pack 500. In this way, the contact 372 constitutes a pack switch shown in FIG. 4.

Next, a description of a mechanism for shifting the magnetic head 326 in connection with FIG. 9 will be given below.

The image reproducing apparatus includes a main body 620. The apparatus main body 620 as shown in FIG. 9, is provided with a head carriage 614 which is free to slide. That is, the head carriage 614 is equipped with a magnetic head 326 which is used to write into or read out from the magnetic disc 310 information stored within the magnetic disc pack 500. Also the head carriage 614 is free to slide along a guide bar 618 fixed to the apparatus main body 620. The rotational force of the stepping motor 330 is transmitted to the head carriage 614 through a gear reduction mechanism and a rotational/linear movements conversion mechanism to be described later, so that the head carriage 614 can be slightly fed.

At first, the gear reduction mechanism will be explained. The output shaft of the stepping motor 330 is provided with a gear 601. The gear 601 is intermeshing with a fan-shaped gear 602 which can be rotated about a shaft 626.

Referring next to the rotational/linear movements conversion mechanism, the fan-shaped gear 602 is provided with a pulley 604 and a steel belt 608 is mounted to the pulley in an α winding manner. That is, the upper-right end portion in FIG. 9 of the steel belt 608 is fixed to the side surface 616 of the head carriage 614 by means of a screw 612. After the steel belt 608 winds once around the pulley 604, it is fixed to the left end portion of the side surface 616 by means of a screw 610. The steel belt 608 is further fixed bo the pulley 604 which is integral with the fan-shaped gear 602, by means of a screw 606. Therefore, if the gear 601 is rotated, then the fan-shaped gear 602 is also rotated following the gear 601. As a result of this, since the head carriage 614 is connected with the fan-shaped gear 602 via the steel belt 608, the amount of the rotational movements of the fan gear 602 is converted into the amount of linear movements, so that the head carriage 614 can be moved.

Figure 9:
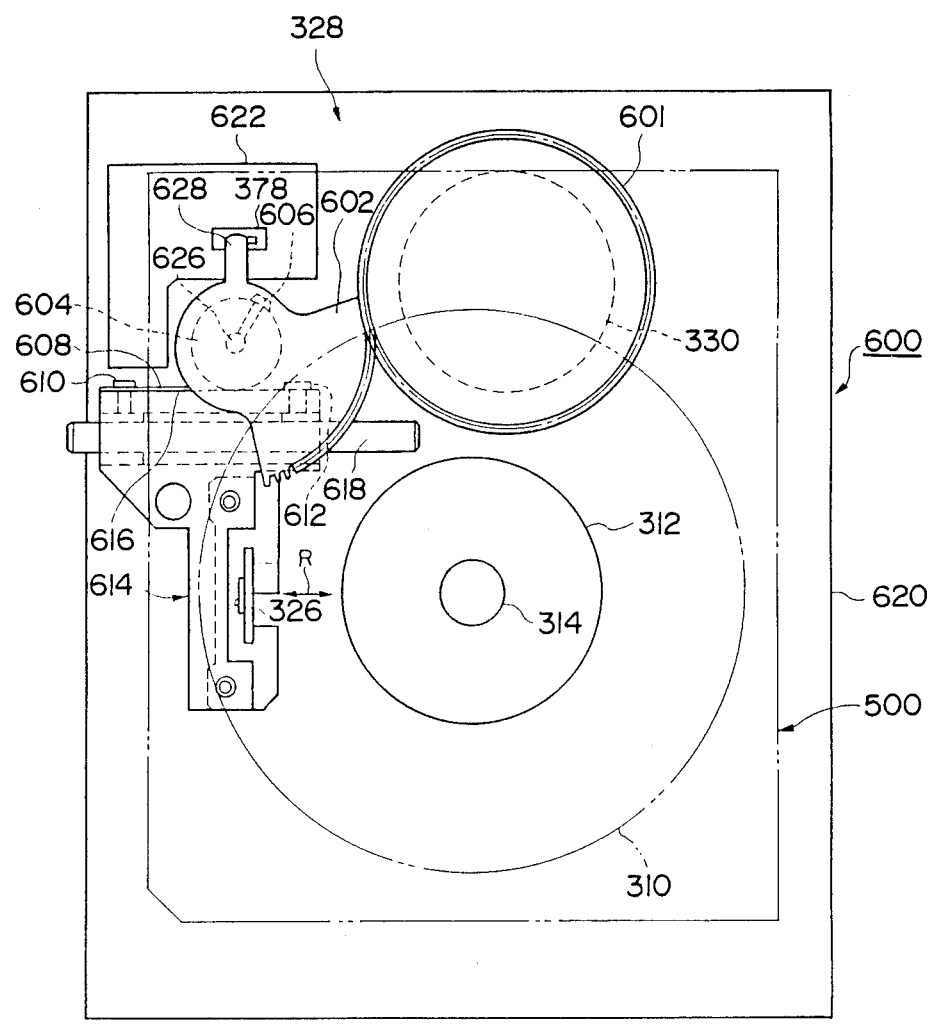
FIG. 9 is a plan view of a magnetic head shift mechanism employed in the present image reproducing apparatus according to the invention.

Also, in FIG. 9, reference numeral 378 designates a H/P (home position) switch means serves as a reference starting point for the magnetic head 326; 312 denotes a DC motor which is used to rotate the magnetic disc 310; and 314 denotes for an output shaft of the DC motor 312.

Figure 8:
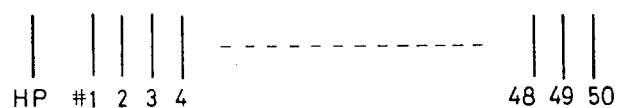
FIG. 8 is an explanatory view to illustrating an example of the arrangement of tracks on a magnetic disc used with the image reproducing apparatus according to the present invention.

In this embodiment, as shown in FIG. 8, the tracks of the magnetic disc 310 are given track Nos. ranging from 1-50, sequentially, starting from the outer-most track, respectively. The original return position HP of the magnetic head 326 is set such that it is situated outside of the outer-most track No. 1. Selection of the tracks or a tracking control is performed by counting the number of tracks, that is the number of peaks of the envelopes as the magnetic head is shifted, using this reference position or original return position HP as a reference. The fact that the magnetic head 326 arrived at the original return position HP of the magnetic disc 310 can be decided by the control device 360 according to the detected output of the home position switch 378.

Tracking can be executed in the following manner. At first, it is assumed that the magnetic head 326 is already situated on a certain track. If the key FW305 or key RV306 is operated, then the control device 360 initiates the stepping motor 330 by means of the drive circuit 350 to shift the magnetic head 326 in the forward or reverse direction.

In this embodiment, the magnetic head 326 is, at first, moved a distance slightly short of 100 μm, for example, by 23 pulses, that is 96 μm or so, in the forward or reverse direction. During this movement, signals read by the magnetic head 326 are detected by the envelope detection circuit 338, and thus the envelope detected signals are inputted to the control device 360 from the ADC 346 in the form of digital data. At that time, the control device 360 shifts the magnetic head 326 further by 1 pulse, while the level of the envelope of the signal detected from the magnetic head 326 is compared with that of the previous envelope.

In this way, while shifting the magnetic head 326, the control device 360 detects and compares the envelope level each time to determine a position which provides the peak of the envelope. The head position where the peak is detected is a position where the magnetic head is located on the track properly. In this manner, the control device 360 carries out the tracking.

In order to locate the magnetic head quickly on the normal track position in the above-mentioned tracking, it is preferred that the magnetic head 326 has been returned to the original return position HP at least prior to initiation of the tracking.

Figure 10:
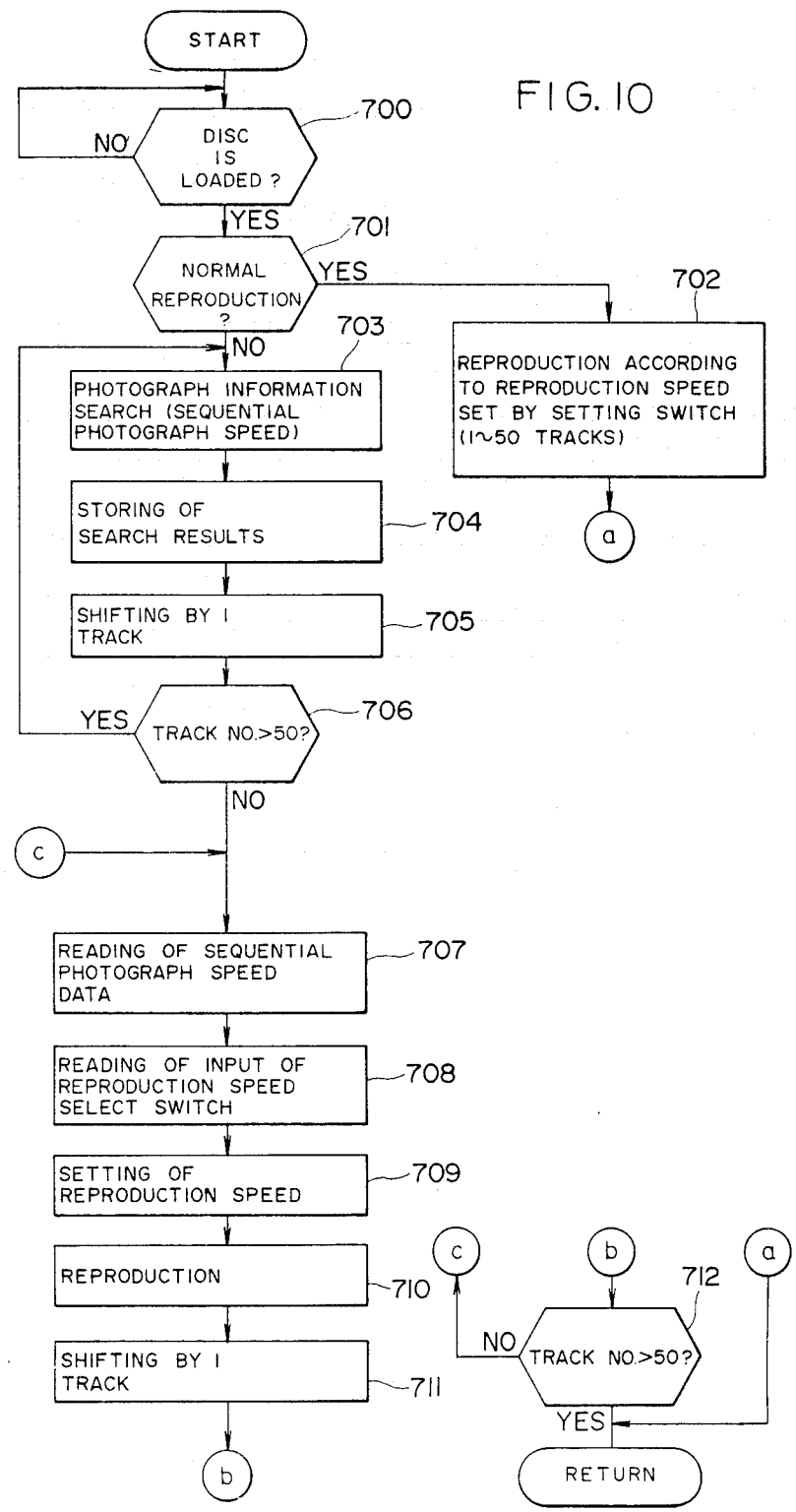
FIG. 10 is a flowchart showing the contents of a program to be executed by the control device in FIG. 4.

Referring next to FIG. 101, there are shown the contents of a program to be executed by the control device 360. In FIG. 10, upon initiating the program, Step 700 is executed. In Step 700, it is decided whether the magnetic disc pack 500 has been mounted to the holder 552 normally, and if the magnetic disc pack 500 has not been mounted yet, the same decision is repeated, while if the magnetic disc pack 500 is normally mounted, the program advances to Step 701. In Step 701, it is determined whether the reproduction mode is the normal reproduction mode or not if it is the normal reproduction mode, the program advances to Step 702. In Step 702, a reproduction which corresponds to the reproduction speed selected by the reproduction speed setting switch 309 is performed to terminate the execution of the program.

On the other hand, when in Step 701 it is decided that the reproduction mode is the sequential photograph reproduction mode, the program goes to Step 703. In Step 703, the magnetic disc 310 is searched for the tracks, with the result that the sequential photograph speed of a series of sequential photograph frames recorded in the sequential photograph mode is read out and the contents are stored in the RAM within the control device 360 in Step 704. Then, in Step 705, the magnetic head 326 is shifted by 1 track by the drive pulse that is supplied from the control device 360 through the drive circuit 350 to the stepping motor 330. After then the program goes to Step 706. In Step 706, it is decided whether the track search has been completed from No. 1 track through No. 50 track, and if the track search has not been completed up to No. 50, the processings in Steps 703 through 706 are repeatedly executed. As a result of this, when the track search is finished the program goes to Step 707.

In Step 707, the sequential photograph speed data stored in the RAM in Step 704 is read out the switch input of the reproduction speed change switch 308 is read out, the above-mentioned sequential photograph speed data is corrected in accordance with the read-out data of the switch 308, and the reproduction speed is set (Steps 708, 709). That is, for example, when in the sequential photograph reproduction mode the reproduction speed change switch 308 is switched to a half speed, namely, the contact A, the reproduction speed is set such that reproduction is performed at a speed half of the sequential photograph speed indicated by the sequential photograph speed data that is read out in Step 707. The setting of the reproduction speed is performed in this manner. In Step 710, the reproducing operation is executed, and in Step 711, the magnetic head 326 is shifted by 1 track.

Accordingly, the reproduction is executed in the sequential photograph mode by means of a series of step mentioned above. When this reproduction is completed up, that is the final track is processed, the execution of the program is terminated, and if not, the program returns back to Step 707 and processing similar to those mentioned above is to be carried out repeatedly.

As has been described above, in the image reproducing apparatus according to the present invention, when a selected reproduction mode is a sequential photograph reproduction mode; a track search is executed, the photograph data that are recorded in a rotary recording medium are stored in memory means, at least the data representing the sequential photograph speed is read out from the photograph data in reproduction, and reproduction is performed in accordance with the squential photograph speed represented by the read out data. Thus, according to the present invention, recorded images can be reproduced properly in such a manner as corresponds to the photographed states irrespective of the photograph conditions.

Next, a description of another embodiment of an image reproducing apparatus, according to the present invention in connection with FIGS. 11 and 12 will be given below. The hardware structure of the image reproducing apparatus according to this embodiment is similar to that shown in FIG. 4.

This embodiment is adapted such that the photograph data (e.g., photograph mode) of the image recorded in the respective tracks of the magnetic disc used as a magnetic recording medium can be displayed previously in a display device.

Figure 11:
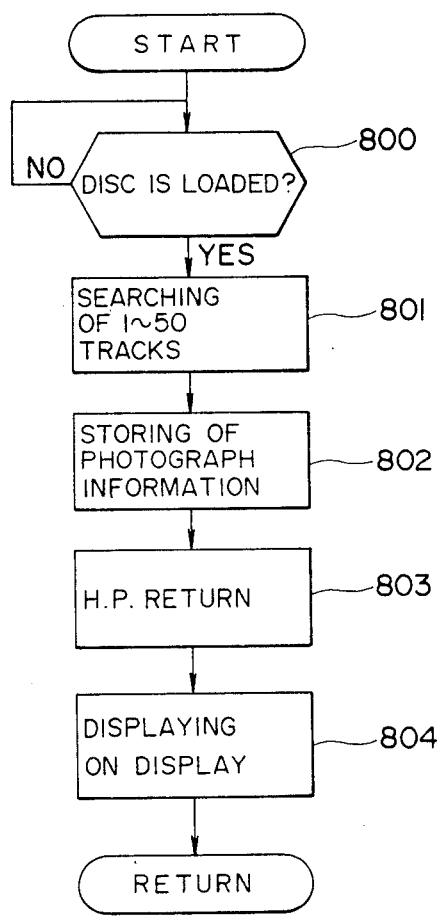
FIG. 11 is a flowchart showing a processing procedure for display of the photograph data.
Figure 12:
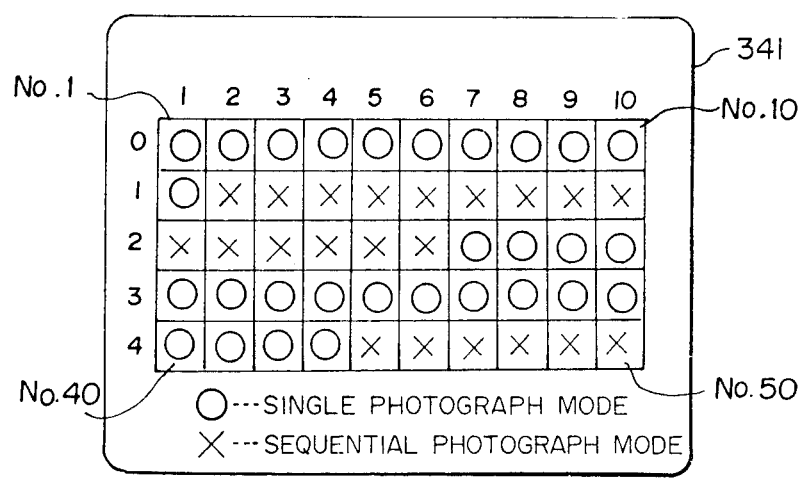
FIG. 12 is an explanatory view showing an example of display of the photograph data.

In FIG. 11, there are shown the contents of a display process routine for the photograph data to be executed by the control device 360 (FIG. 4).

In this figure, when the power supply is applied by a power switch PS302 and one of the data key group, DATA304, for example, the photograph mode key, is depressed, this program is initiated. At first, it is decided, in Step 800, whether the magnetic disc pack 500 is mounted in the holder 552 normally or not. That is, when one of the contact 372 of the pack switch and the contact 370 of the load switch is not closed, it is decided that the magnetic disc pack 500 is not mounted normally and thus the same processing is repeated until both of the pack switch and load switch are closed. On the other hand, when the magnetic disc pack 500 is mounted normally in step 800, then the program advances to Step 801. In Step 801 the tracking control is performed to search all of the tracks ranging from the track No. 1 to the track No. 50. During this tracking, the DPSK signals recorded on the respective tracks are reproduced by the DPSK reproduction circuit 416 of the signal process circuit 336, and the reproduced signals are then supplied to the control device 360. The control device 360 stores the photograph data obtained from the reproduced signals in a memory (RAM) sequentially. After completion of the processing in Step 802, the program goes to Step 803. In Step 803, the magnetic head 326 is returned to the original return position HP. After the processing in Step 803 is finished, the program advances to Step 804. In Step 804, in order to display on the display device the photograph data for all of the tracks stored in the memory, the control device 360 outputs the control signal CHARAC to the character generation circuit 418 of the signal process circuit 336. As a result of this, a predetermined character signal based on the control signal CHARAC is outputted from the character generation circuit 418 to the TV monitor 341 via the signal output terminal 340. For example, as shown in FIG. 12, by displaying on the screen of the TV monitor 341 the tracks on which the still images photographed in the single photograph mode are recorded with circles and the tracks on which the still images photographed in the sequential photograph mode are recorded with crosses, the photographed states can be easily understood according to the circles and crosses. In FIG. 12, the still images photographed in the single photograph mode are recorded on the tracks ranging from the track No. 1 to the track No. 11 and ranging from the track No. 27 to the track No. 44, while the still images photographed in the sequential photograph mode are recorded on the other tracks.

In this manner, displaying the photograph data on the screen of the TV monitor 341 in Step 804 completes the execution of the display process routine of the photograph data. Then, if a new key of the data key group DATA 304 is operated, a display process of the photograph data in accordance with the new key operation can be executed again.

As described above, in the image reproducing apparatus according to this embodiment, the photograph data representing the photographed states of the still images recorded on the magnetic disc can be reproduced from the DPSK signals including the photograph data, and the reproduced photograph data can be displayed on the display screen for the respective tracks.

Although this embodiment is arranged such that the photograph data is outputted from the signal output terminal of the image reproducing apparatus to the TV monitor and is then displayed on the screen of the TV monitor, the present invention is not limited to this. The photograph data may be outputted to a printing device such as a printer or the like to be displayed on paper.

Also, in an image reproducing apparatus comprising a main body which is provided with a display device such as a TV monitor, a printer, or the like, the display device may be used to display the photograph data.

Also, the photograph data may be extracted from signals other than the DPSK signals, that is the extraction of the photograph may be performed from any kinds of signals containing the photograph data. For example, when the data signal representing the photograph data is coupled with a video signal, the photograph data may be extracted from the video signal.

As can be seen from the above description, the image reproducing apparatus according to the present invention can be controlled, such that in accordance with the data signal extracted by the data signal extract means the photograph data can be displayed on the display means in such a manner as to correspond to the image recorded in the respective tracks. Therefore, the photograph data can be displayed in various manners by the display device, and in accordance with the photograph data displayed, an object recorded in motion, for example, in the sequential photograph mode, can be reproduced in the same moving state as recorded.

Now, a description of still another embodiment of the image reproducing apparatus according to the invention in connection with FIG. 13 will be given below. In this embodiment, a series of images photographed in the sequential photograph mode on the magnetic recording medium, such as a magnetic disc or the like, can be reproduced automatically and repetitively from the data signal representing the photograph mode of the images. It should be noted here that the hardware structure of the image reproducing apparatus according to this embodiment is basically the same as that of the image reproducing apparatus shown in FIG. 4.

Figure 13:
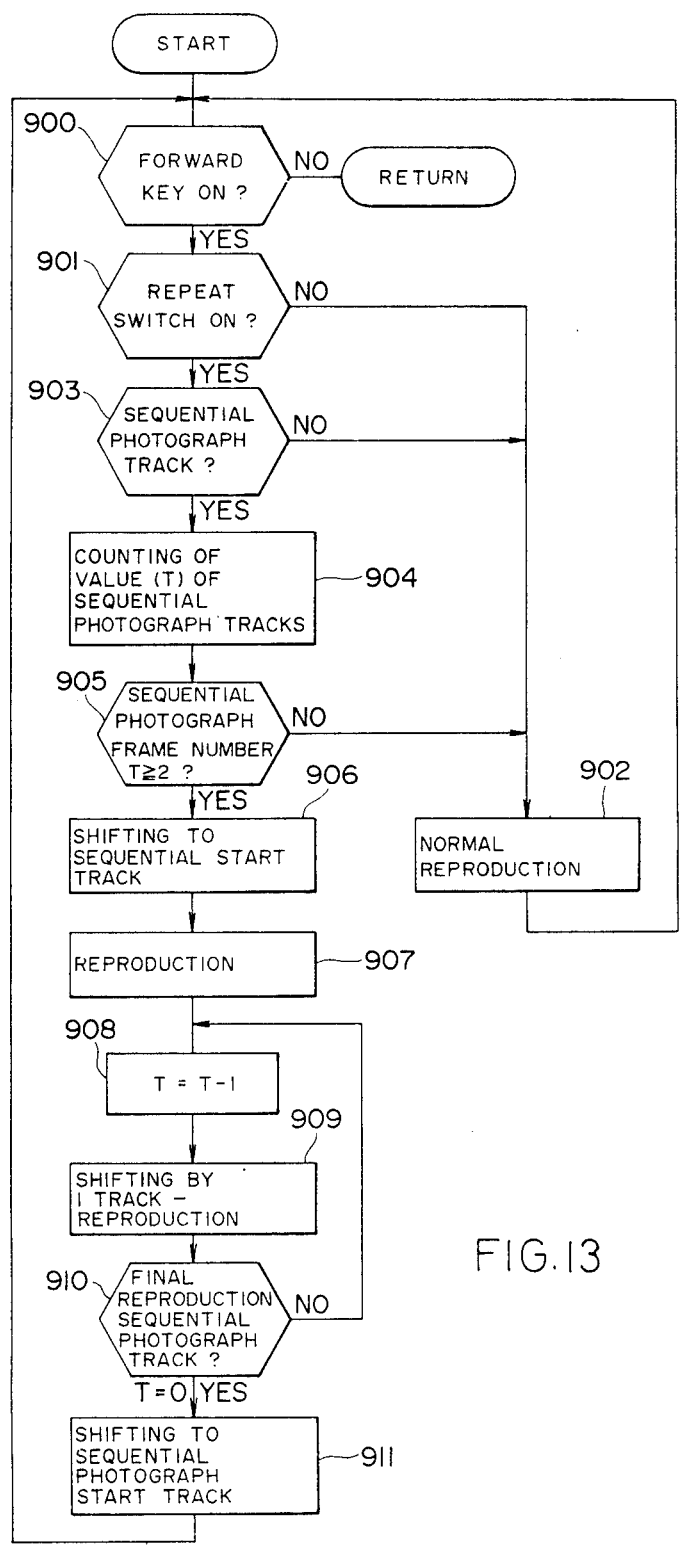
FIG. 13 is a flowchart showing a processing procedure for display of a series of still images photographed in a sequential photograph mode.

In FIG. 13, there are illustrated the contents of a process routine to be executed by the control device 360 in order to reproduce automatically a series of still images photographed in the sequential photograph mode.

Referring to FIG. 13, after the power supply is applied the power switch PS302, and thus, the magnetic disc pack 500 is normally mounted to the holder 552, the magnetic disc 310 is constantly rotated at a speed of 3600 rpms by the DC motor 312. In this state, if a key, for example, the forward feed key FW305 is depressed, the program of the above-mentioned process routine is initiated. At first, in Step 900, in a state in which the magnetic head 326 is positioned on the track No. 1, it is decided whether the forward feed key FW305 is depressed or not. If it is found that the forward feed key FW305 is not depressed, it is decided that an operation to reproduce the still images recorded in the respective tracks of the magnetic disc 310 along the forward direction of the tracks is to be stopped and thus the process moves to another process routine. On the contrary, if it is found in Step 900 that the forward feed key FW305 is depressed, it is decided that an operation for reproduction by means of the forward feed key FW305 is to be continued and thus the program advances to Step 901. In Step 901, it is decided whether a repeat switch 303, which is used to indicate the repetitive reproduction of a series of still images photographed in the sequential photograph sequence of the sequential photograph mode, among the photograph modes, is closed or not. If it is found that the repeat switch 303 is not closed, it is decided that a series of still images in the sequential photograph sequence are not to be reproduced and thus the program proceeds to Step 902. In Step 902, the reproduction of 1 frame of still image recorded on the accessing track is executed, and after this processing is finished, the program returns back to Step 900, where the same processing is repeated.

On the other hand, if it is decided in Step 901 that the repeat switch 303 is closed, then the program proceeds to Step 903. In Step 903, it is checked whether the still images recorded on the track now being accessed by the magnetic head 326 are those which are photographed in the sequential photograph mode. This check is executed by the control device 360 reading the photograph data obtained from the DPSK signals reproduced by the DPSK reproduction circuit 416 of the signal process circuit 336. If it is decided in Step 903 that the still images recorded in the track being currently accessed are not those photographed in the sequential photograph mode, the program proceeds to Step 900. In Step 902, as in the above-mentioned case, 1 frame of still image recorded on the track being currently accessed is reproduced and, the program returns to Step 900, where the same processing is repeated. On the contrary, if it is decided in Step 903 that the relevant still images are those photographed in the sequential photograph mode, the program proceeds to Step 904. In Step 904, the tracks in which a series of still images photographed in the sequential photograph mode are recorded are searched sequentially from the track currently accessed and the number of the tracks searched are then stored in the RAM as the count value of the number of the still images. After completion of the processing in Step 904, the program advances to Step 905. In Step 905, it is checked whether the count value of the number of the still images photographed in the sequential photograph mode is 2 or more. If the resultant count value is 1, it is decided that the number of the still image is only one and thus the program moves to Step 902. In Step 902, although it is the still image photographed in the sequential photograph mode, as in the above-mentioned case, 1 frame of the still image recorded in the track currently accessed is reproduced and, the program goes back to Step 900, in which the same processing is repeated.

On the other hand, if the count value of the number of the still images photographed in the sequential photograph mode is found 2 or more, the program proceeds to Step 904, In Step 906, the magnetic head 326 is moved to the start track of the tracks in which the still images photographed in the sequential photograph mode are recorded. On completing the processing in Step 906, the program proceeds to Step 907. In Step 907, the reproduction of 1 frame of the still image recorded in the track currently accessed is initiated. After completion of the processing in Step 907, the program advances to Step 908. In Step 908, the count value T stored in the RAM is decremented by 1 according to the number of the still images reproduced, and the count value T is stored again in the RAM. On completing the processings in Step 908, the program proceeds to Step 909. In Step 909, after the magnetic head 326 is moved 1 track in the forward direction, 1 frame of still image photographed in the sequential photograph mode and recorded in the track currently accessed is reproduced in succession. After the processing in Step 909 is completed, the program proceeds to Step 901. In Step 910, it is determined whether the track currently accessed is the last track of the tracks in which the still images photographed in the sequential photograph mode are recorded is by means of the count value T.

That is, if the count value T is found not to be zero, it is decided that it is not the last track and thus the program goes back to Step 908. During the process routine in Step 908, the count value T is previously decremented by 1 according to the number of the still images to be reproduced in Step 909. On completion of the processing in Step 908, the program proceeds to Step 909. In Step 909, as in the above-mentioned case, the magnetic head 326 is shifted again and the still image recorded on the track currently accessed is also reproduced. After the processings in Step 909 are terminated, the program advances to Step 910. In Step 910, it is determined whether the track currently accessed is the last track in which the still images photographed in the sequential photograph mode are recorded and this checking is repeated until the track currently accessed reaches the above-mentioned last track. And if it is decided in Step 910 that the track currently accessed is the abovementioned last track (T=0), then the program proceeds to Step 911. In Step 911, the magnetic head 326 is moved from the last track to the start track.

After the processing in Step 911 is completed, the program goes back to Step 900. In Step 900, it is checked again whether the forward feed key FW305 is depressed or not. If it is found that the forward feed key FW305 is still depressed, the program advances to Step 901. In Step 910, it is determined whether the repeat switch 303 is depressed or not. Only when it is found in Step 901 that the repeat switch 303 is depressed, as in the above-mentioned case, the reproduction of a series of still images photographed in the sequential photograph mode is executed through Steps 903, 904, 905, 906, 907, 908. 909, 910, and 911. That is, the repetitive reproduction of a series of still images photographed in the sequential photograph mode can be terminated only when the forward feed key FW305 is not depressed in Step 900 or when the repeat switch 303 is released in Step 901. Also, if it is found in Step 900 that the forward feed key FW305 is not depressed, then the program moves to another process routine while the magnetic head 326 is continuing the reproduction of the still images recorded in the track being currently accessed by the magnetic head 326.

As described above, in the image reproducing apparatus according to the present embodiment, a series of still images photographed in a sequential photograph mode, among the photograph modes, are identified by data signals indicating the photograph modes of the respective still images and these still images are reproduced track by track in the order of the start track down to the last track where the still images are recorded and then displayed on a TV monitor. However, the present invention is not limited to this. On the contrary, the respective still images may be reproduced from the tracks in the order of the last track up to the start track for display.

In this embodiment, the photograph data can be extracted not only from the DPSK signals, but also from any other kinds of signals which contain the photograph data. For example, when the data signal representing the photograph data is coupled with a video signal, the photograph data may be extracted from the video signal.

As has been described above, in the image reproducing apparatus according to the present invention, the signal reproducing means and the video signal processing means can be controlled such that the outputs of the data signal extract means and repeat reproduction setting means are received. When the video signal output from the signal reproducing means is decided from the data signal extracted by the data signal extract means that it is a video signal representing a frame of still image photographed in the sequential photograph mode, the video signals corresponding to a series of sequential photograph frames of still images photographed in the sequential photograph mode can be outputted sequentially and repetitively to the display means during the time period set by the repeat reproduction setting means. Therefore, in the image reproducing apparatus according to the present invention, the still images photographed in the sequential photograph mode can be automatically retrieved from the still images recorded on the magnetic recording medium and also a series of such sequentially photographed still images can be displayed repetitively on a display device such as a TV monitor or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording/reproducing apparatus for use with a magnetic recording medium such as a magnetic disc or the like, the magnetic recording medium being rotatively driven, and a magnetic head being shifted in a radial direction with respect to the magnetic recording medium to record onto the magnetic recording medium video signals obtained by photographing an object or to reproduce the video signal recorded on the magnetic recording medium, said image recording/reproducing apparatus, comprising:

photograph mode setting means for setting up photograph modes, said photograph modes including at least a sequential photograph mode;

reproduction mode setting means for setting up one of a plurality of reproduction modes, said reproduction modes including at least a sequential photograph reproducing mode for permitting reproduction to be performed at a reproduction speed corresponding to a sequential photograph speed;

recording means for recording said video signals together with various kinds of data signals onto said magnetic recording medium;

signal reproducing means for reproducing the signals recorded on said magnetic recording medium;

said signal reproducing means including, magnetic head shift means for shifting said magnetic head in the radial direction of said magnetic recording medium;

memory means for storing photograph data, said photograph data including at least data representing said sequential photograph speed recorded on each of tracks provided on said magnetic recording medium; and control means, responsive to an output of said photograph mode setting means or said reproduction mode setting means, for controlling said recording means such that data signals representing the photograph data including the number of frames to be photographed in one sequential photograph unit and the sequential photograph speed thereof are recorded onto said magnetic recording medium when said photograph mode is set to said sequential photograph mode;

said control means for searching said tracks, storing said photograph data recorded on said magnetic recording medium in said memory means, and reading out from said memory means at least said data representing said sequential photograph speed of said photograph data when reproduction is to be performed and said reproducing mode is set to the sequential photograph mode, thereby controlling said mangetic head shift means so that said magnetic head shift means performs its reproducing operation in accordance with said read-out data.

2. An image recording apparatus for recording video signals obtained by photographing an object onto a magnetic recording medium, such as a magnetic disc or the like, said image recording apparatus, comprising:
photograph mode setting means for setting up photograph modes, said photograph modes including at least a sequential photograph mode;
recording means for recording said video signals together with various kinds of data signals onto said magnetic recording medium; and
control means, responsive to an output of said photograph mode setting means, for counting the number of frames to be photographed in one sequential photograph unit and for controlling said recording means such that a data signal representing said number of frames counted is recorded onto said magnetic recording medium when at least said photograph mode is set.

3. The image recording apparatus as claimed in claim 2, wherein said data signal is recorded onto the same track of said magnetic recording medium that said video signal is recorded on.

4. The image recording apparatus as claimed in claim 2 or 3, wherein said data signal includes sequential photograph speed information.

5. An image reproducing apparatus in which a rotary recording medium, such as a magnetic disc or the like, is rotatively driven and a magnetic head is shifted in a radial direction of said rotary recording medium to reproduce signals including video signals representing images recorded on each of a plurality of tracks provided on said rotary recording medium as well as data signals representing photograph data of said images such as a sequential photograph speed and the like, said image reproducing apparatus, comprising:
signal reproducing means for reproducing the signals recorded in said rotary recording medium;
said signal reproducing means including,
a magnetic head shift means for shifting said magnetic head in the radial direction of said rotary recording medium;
reproduction mode select means for selecting one of a plurality of reproducing modes, said reproducing modes including a sequential photograph reproducing mode which allows reproduction to be performed at a reproduction speed corresponding to a sequential photograph speed;
memory means for storing photograph data, said photograph data including at least data representing the sequential photograph speed recorded on each of said tracks on said rotary recording medium; and
control means, responsive to an output of said reproduction mode select means, for driving said magnetic head shift means to execute a track search in accordance with said output of said signal reproducing means so as to store said photograph data recorded on said rotary recording medium in said memory means when the selected reproducing mode is said sequential photograph reproducing mode;
said control means also reading out at least said data representing said sequential photograph speed out of said photograph data during reproduction mode, and controlling the driving of said magnetic head shift means such that reproduction is executed in accordance with said sequential photograph speed represented by said read-out data.

6. The image reproducing apparatus as claimed in claim 5, wherein said image reproducing apparatus further comprises:
reproduction speed change means for changing said sequential photograph speed represented by said data read out from said memory means when reproduction is to be executed in said sequential photograph reproducing mode.

7. An image reproducing apparatus comprising:
signal reproducing means for reproducing video signals representing images recorded on each of a plurality of tracks provided on a magnetic recording medium and for reproducing data signals representing photograph data of said images such as a sequential photograph speed and the like;
data signal extract means for extracting said data signals reproduced from each of said tracks by said signal reproducing means;
display means for displaying said images or said photogaph data; and
control means, responsive to said data signals extracted by said data signal extract means, for allowing said display means to display said photograph data in such a manner that said photograph data correspond to said images recorded on each of said tracks.

8. An image reproducing apparatus comprising:
signal reproducing means for reproducing video signals representing still images recorded on each of a plurality of tracks on a magnetic recording medium, said images photographed in photograph modes including at least a sequential photograph mode and for reproducing data signals representing photograph data of said still images such as said photograph modes and the like;
video signal process means for processing said video signals reproduced from each of said tracks by said signal reproducing means into predetermined TV signals;
data signal extract means for extracting said data signals out of said signals reproduced from each of said tracks by said signal reproducing means;
display means for displaying said still images or said photograph data;
repetitive reproduction setting means for specifying a directive that only a series of sequential photograph frames photographed in said sequential photograph mode are to be reproduced repetitively; and
control means, responsive to outputs of said data signal extract means and said repetitive reproduction setting means, for controlling said signal reproducing means and said video signal process means such that the video signals corresponding to said series of sequential photograph frames of said still images photographed in said sequential photograph mode are outputted sequentially and repetitively to said display means during a period set by said repetitive reproduction setting means when the data signal extracted by said data signal extract means indicates that said video signal outputted from said signal reproducing means is a video signal that represents one frame of still image photographed in said sequential photograph mode.

* * * * *